(12) United States Patent
Wang et al.

(10) Patent No.: US 11,164,308 B2
(45) Date of Patent: Nov. 2, 2021

(54) SYSTEM AND METHOD FOR IMPROVED MEDICAL IMAGES

(71) Applicant: The Regents of the University of California, Oakland, CA (US)

(72) Inventors: Xiaoyong Wang, Los Angeles, CA (US); Pechin Lo, Los Angeles, CA (US); Matthew Brown, Marina del Rey, CA (US); Bharath Ramakrishna, Los Angeles, CA (US); Jonathan Goldin, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 54 days.

(21) Appl. No.: 15/906,005

(22) Filed: Feb. 27, 2018

(65) Prior Publication Data

US 2018/0247408 A1 Aug. 30, 2018

Related U.S. Application Data

(60) Provisional application No. 62/463,873, filed on Feb. 27, 2017.

(51) Int. Cl.
| | | |
|---|---|---|
| *G06T 7/00* | (2017.01) | |
| *G06K 9/62* | (2006.01) | |
| *G06T 7/35* | (2017.01) | |

(52) U.S. Cl.
CPC .......... *G06T 7/0012* (2013.01); *G06K 9/6202* (2013.01); *G06K 9/6256* (2013.01);
(Continued)

(58) Field of Classification Search
CPC .. G06K 9/6267; G06K 9/6256; G06K 9/6269; G06K 9/6284; G06K 9/6202; G06K 2209/05; G06T 7/0012; G06T 7/35; G06T 2207/30061; G06T 2207/30016; G06T 2207/20016; G06T 2207/10081; G06T 2207/20081; G06T 2207/10088
See application file for complete search history.

(56) References Cited

U.S. PATENT DOCUMENTS

| | | | |
|---|---|---|---|
| 10,410,348 B2 * | 9/2019 | Han | G06T 7/0014 |
| 2004/0202368 A1 * | 10/2004 | Lee | G06K 9/00624 382/173 |

(Continued)

OTHER PUBLICATIONS

Hall, "Correlation-based Feature Selection for Discrete and Numeric Class Machine Learning", Working paper 00/08, Hamilton, New Zealand: University of Waikato, Department of Computer Science, 2000, pp. 1-10 (Year: 2000).*

(Continued)

*Primary Examiner* — Nay A Maung
*Assistant Examiner* — Jose M Torres
(74) *Attorney, Agent, or Firm* — Quarles & Brady LLP (57) ABSTRACT

A method for using machine learning to perform classification of anatomical coverage of images includes acquiring a series of medical images of a subject. The method also includes automatically, with a computer system, analyzing each image in the series of medical images using a machine-learning technique to classify each image in the series of medical images based on anatomical structures reflected in each image in the series of medical images.

18 Claims, 7 Drawing Sheets
(2 of 7 Drawing Sheet(s) Filed in Color)

(52) U.S. Cl.
CPC ......... *G06K 9/6269* (2013.01); *G06K 9/6284* (2013.01); *G06T 7/35* (2017.01); *G06K 2209/05* (2013.01); *G06T 2207/10081* (2013.01); *G06T 2207/10088* (2013.01); *G06T 2207/20016* (2013.01); *G06T 2207/20081* (2013.01); *G06T 2207/30016* (2013.01); *G06T 2207/30061* (2013.01)

(56) References Cited

U.S. PATENT DOCUMENTS

| | | | |
|---|---|---|---|
| 2005/0071300 A1* | 3/2005 | Bartlett | G06K 9/6215 706/12 |
| 2006/0104494 A1* | 5/2006 | Collins | G06T 7/0012 382/128 |
| 2011/0188706 A1* | 8/2011 | Zhou | G06K 9/00 382/103 |
| 2012/0269436 A1* | 10/2012 | Mensink | G06K 9/00624 382/180 |
| 2012/0281900 A1* | 11/2012 | Rueckert | G06K 9/468 382/131 |
| 2014/0247977 A1* | 9/2014 | Han | G06K 9/34 382/159 |
| 2016/0239969 A1* | 8/2016 | Davatzikos | G06T 7/0012 |
| 2017/0046616 A1* | 2/2017 | Socher | G06K 9/4628 |
| 2017/0091574 A1* | 3/2017 | Udupa | A61N 5/1039 |
| 2017/0200067 A1* | 7/2017 | Zhou | G06T 7/174 |

OTHER PUBLICATIONS

Chang C-C et al. LIBSVM: a library for support vector machines. ACM Transactions on Intelligent Systems and Technology, 2:27:1-27:27 (2011).

Criminisi A, et al., "Regression forests for efficient anatomy detection and localization in computed tomography scans," Medical Image Analysis, vol. 17, Issue 8, 1293-1303 (2013).

Fenchel M, et al., "Automatic labeling of anatomical structures in MR FastView images using a statistical atlas," Med Image Comput Comput Assist Interv. 11(1):576-84 (2008).

Hall, M. A. "Correlation based feature selection for machine learning." Ph.D Diss. Dept of Computer Science, Waikato University (1998).

Hall, M. A., et al. "Practical Feature Subset Selection for Machine Learning," Proc, 21st Australasian computer science conference, 181-191 (1998).

Hing, Esther, et al "Generalist and Specialty Physicians: Supply and Access, 2009-2010", http://www.cdc.gov/nchs/data/databriefs/db105.pdf (Sep. 2012).

Isgum I, et al., "Multi-atlas-based segmentation with local decision fusioin application to cardiac and aortic segmentation in ct scans," Proc IEEE Med. Imaging, 28 (2009).

Joachims, T. "Text categorization with Support Vector Machines: Learning with many relevant features," Proceedings of the 10th European Conference on Machine Learning, 137-142 (1998).

Klein, S., et al, "elastix: a toolbox for intensity based medical image registration," IEEE Transactions on Medical Imaging, vol. 29, No. 1, pp. 196-205 (2010).

Liu Y, et al., "A survey of content-based image retrieval with high-level semantics," Pattern Recognition; 40: 262-82 (2007).

Shamonin D.P., et al, "Fast Parallel Image Registration on CPU and GPU for Diagnostic Classification of Alzheimer's Disease", Frontiers in Neuroinformatics, vol. 7, No. 50, pp. 1-15 (2014).

Shimizu A, et al, "Multi-organ segmentation in three-dimensional abdominal CT images," Int. J. CARS, 1 (2006).

Zheng Y, et al "Fast automatic heart chamber segmentation from 3d ct data using marginal space learning and steerable features," Proc IEEE 11th International Conference, Computer Vision, 1-8(2007).

* cited by examiner

SYSTEM AND METHOD FOR IMPROVED MEDICAL IMAGES

CROSS-REFERENCE TO RELATED APPLICATIONS

This application is based on, claims priority to, and incorporates herein by reference in its entirety for all purposes, U.S. Provisional Application 62/463,873, filed Feb. 27, 2017, entitled, "SYSTEM AND METHOD FOR IMPROVED MEDICAL IMAGES."

STATEMENT REGARDING FEDERALLY SPONSORED RESEARCH

N/A

BACKGROUND

The present disclosure is directed to systems and methods for medical imaging. More particularly, the present disclosure relates to systems and methods for efficient, automated classification of images or image views based on anatomy.

Medical imaging data has been growing by 20% to 40% every year. However, the number of physicians per capita in the United States has not changed. This has led to an increase in the demand for assistance with analyzing or otherwise processing Computed Tomography (CT) data in order to classify the medical images, since proper classification is a prerequisite for other analysis applications such as image segmentation, computer-aided diagnosis systems, clinical decision support systems, and the like.

Typically, identification of a given medical image is done through DICOM headers, which include a series of descriptions about the image itself. As such, textual features, consisting of various keywords, have been used to annotate and retrieve desired images. This approach relies upon manual entry of non-standardized or vendor-dependent naming conventions, making it difficult to generalize such systems. In order to overcome the limitations of textual classification based on DICOM headers, some have incorporated information directly from the image, mainly in the form of detection and localization of anatomic structures.

Statistically, atlas-based registration is one of the popular approaches for anatomical localization by aligning the input scan to a suitable atlas with known body position. With this in mind, some have proposed to build a single atlas from a representative training set and then non-rigidly register unseen scans to the atlas and propagate anatomical labels to them from the atlas. The accuracy of this approach is limited by intra- and inter-subject variability in organ location and size, such as topological changes in organ boundary due to disease.

A multi-atlas approach has also been attempted that aimed to lessen the effect of data variability. For example, Isgum I, Staring M, Rutten A Prokop M, Ginneken B., "Multi-atlas-based segmentation with local decision fusion application to cardiac and aortic segmentation in CT scans," Proc IEEE Med. Imaging, 28 (2009), selected five scans as atlases from a training set. Based on overall distribution of image types, representative atlases included coverage of thorax, abdominal-thorax, and whole body. An input unseen scan was registered to all the five atlases and the atlas that yielded a smallest registration cost was selected as the best one to label that particular scan. Non-rigid registration plus multiple atlases led to significantly greater computation time.

Zheng Y, Barbu A, Georgescu B, Scheuering M, Comaniciu D "Fast automatic heart chamber segmentation from 3D CT data using marginal space learning and steerable features," Proc IEEE 11th International Conference, Computer Vision, 1-8(2007) proposed an approach named Marginal Space Learning (MSL). Instead of exhaustively searching the original nine-dimensional pose parameter space (3 for position, 3 for orientation, 3 for scales), Zheng et al. split the estimation into three steps: a classifier trained for position estimation, a second classifier trained for position-orientation estimation, and a third classifier trained for position-orientation-scale estimation. Only a small number of candidates were preserved to prune search space after each step. However, this implementation was designed for single-object localization. Detection speed is also still a concern.

Criminisi A, Robertson E, Konukoglu E, Shotton J, Pathak S, White S, Siddiqui K., "Regression forests for efficient anatomy detection and localization in computed tomography scans," Medical Image Analysis, Volume 17, Issue 8, 1293-1303 (2013) proposed a method for detection and localization of anatomical structures (e.g. liver, heart, lung CT scans based on regression forests). In this method, all voxels in a test CT volume contribute with varying confidence to estimate the position of a bounding box of organs and they aim to learn the non-linear mapping from voxels directly to organ position and size with training focusing on maximizing the confidence of output predictions. As a result, landmarks for a specific organ are identified for localization.

For all the methods above, there is a common drawback: more overhead is needed to establish associated ground truth when preparing the training and testing set. The regression forests method, for example, requires accurate bounding boxes of all organs in each scan. Other methods require prior segmentation or semi-segmentation of ROIs to restrict the source of features.

Thus, it would be desirable to have systems and methods for image coverage classification that was more efficient than manual description, but does not replace manual overhead with extensive computational overhead requirements to prepare training and testing sets.

SUMMARY

The present disclosure overcomes the aforementioned drawbacks by providing systems and methods for using machine learning to perform classification of anatomical coverage of images. Instead of aiming at identification of specific anatomical structures or landmarks, the systems and methods of the present disclosure are adapted to consider the overall coverage of the image, whether a given image is a brain or chest scan. With this shift in paradigm, the systems and methods of the present disclosure can be efficiently trained without user interaction or pre-processing.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

The patent or patent application file contains at least one drawing in color. Copies of this patent or patent application publication with color drawings will be provided by the Office upon request and payment of the necessary fee.

DETAILED DESCRIPTION

As will be described, the present disclosure provides systems and methods to efficiently classify different anatomic coverages of medical images. In this context, "classify" or "classification" relates to a categorization or description of each medical image based on the particular anatomy reflected in the medical image. For purposes of providing an example, the detailed description herein will describe one classification process that uses four image classifications that include brain, chest, abdomen-pelvis, and chest-abdomen-pelvis (CAP). Of course, other numbers of classifications and/or particular classifications may be readily used. Furthermore, the present description, for purposes of providing an example, will describe classification of CT images; however, other imaging modalities are likewise within the scope of the disclosure.

Figure 1A:
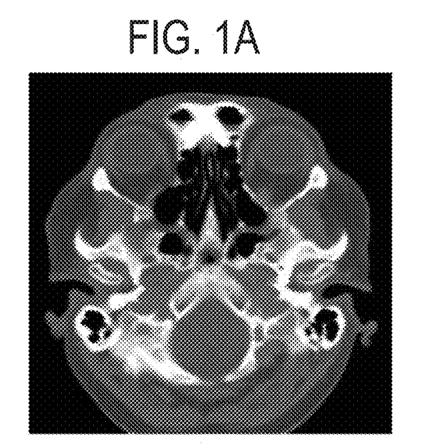
FIG. 1A is an example of a brain image.
Figure 1B:
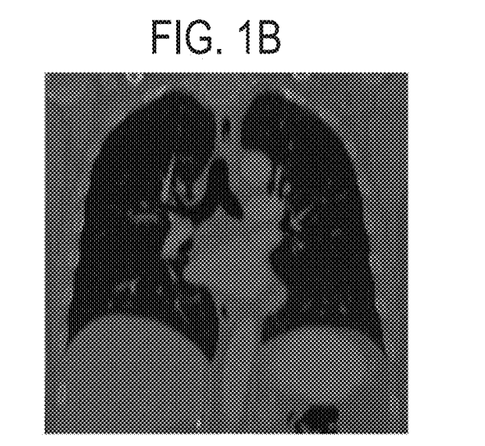
FIG. 1B is an example of a chest image.
Figure 1C:
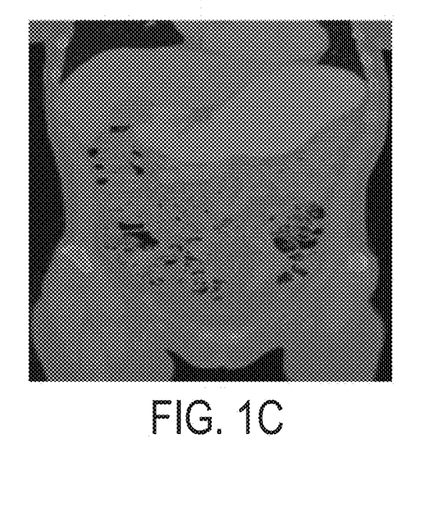
FIG. 1C is an example of an abdomen-pelvis image.
Figure 1D:
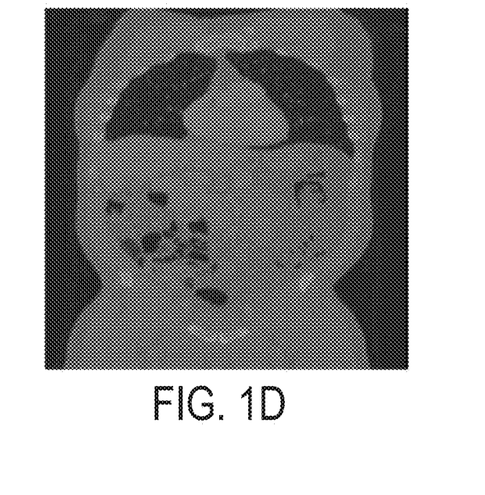
FIG. 1D is an example of a chest-abdomen-pelvis image

In the following, non-limiting example, common acquisitions in CT imaging are illustrated. In particular, FIGS. 1A-1D are images showing typical coverage for four examples of anatomical views for classification based thereon. Namely, FIG. 1A is an example of a brain image. FIG. 1B is an example of a chest image. FIG. 1C is an example of an abdomen-pelvis image. FIG. 1D is an example of a chest-abdomen-pelvis image. Instead of building a universal classification model to identify each of these 4 types of images, the present disclosure uses four individual binary classifiers, trained using machine learning techniques with a one-vs-rest strategy. Of course, the number 4 is non-limiting and other numbers of binary classifiers could be used.

Figure 2:
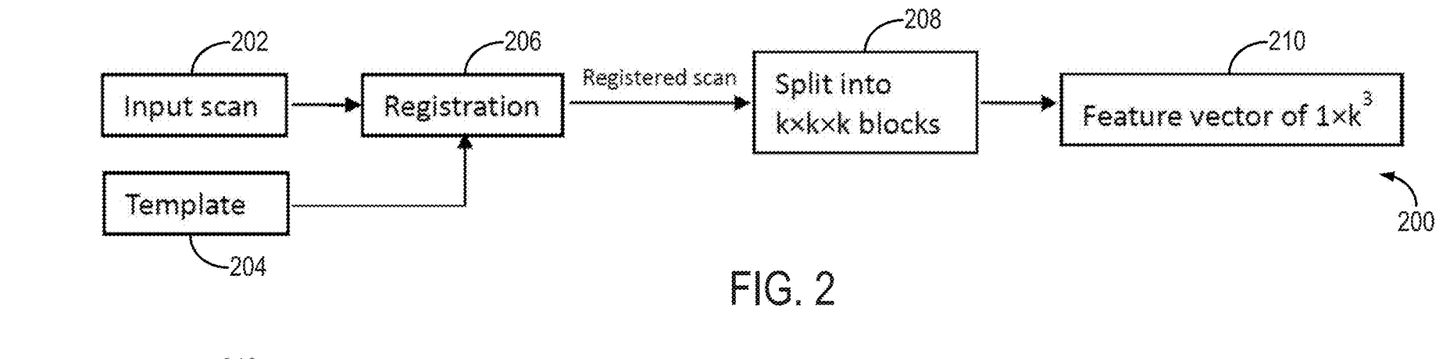
FIG. 2 is a flow chart of a process for feature extraction in accordance with the present disclosure.
Figure 3:
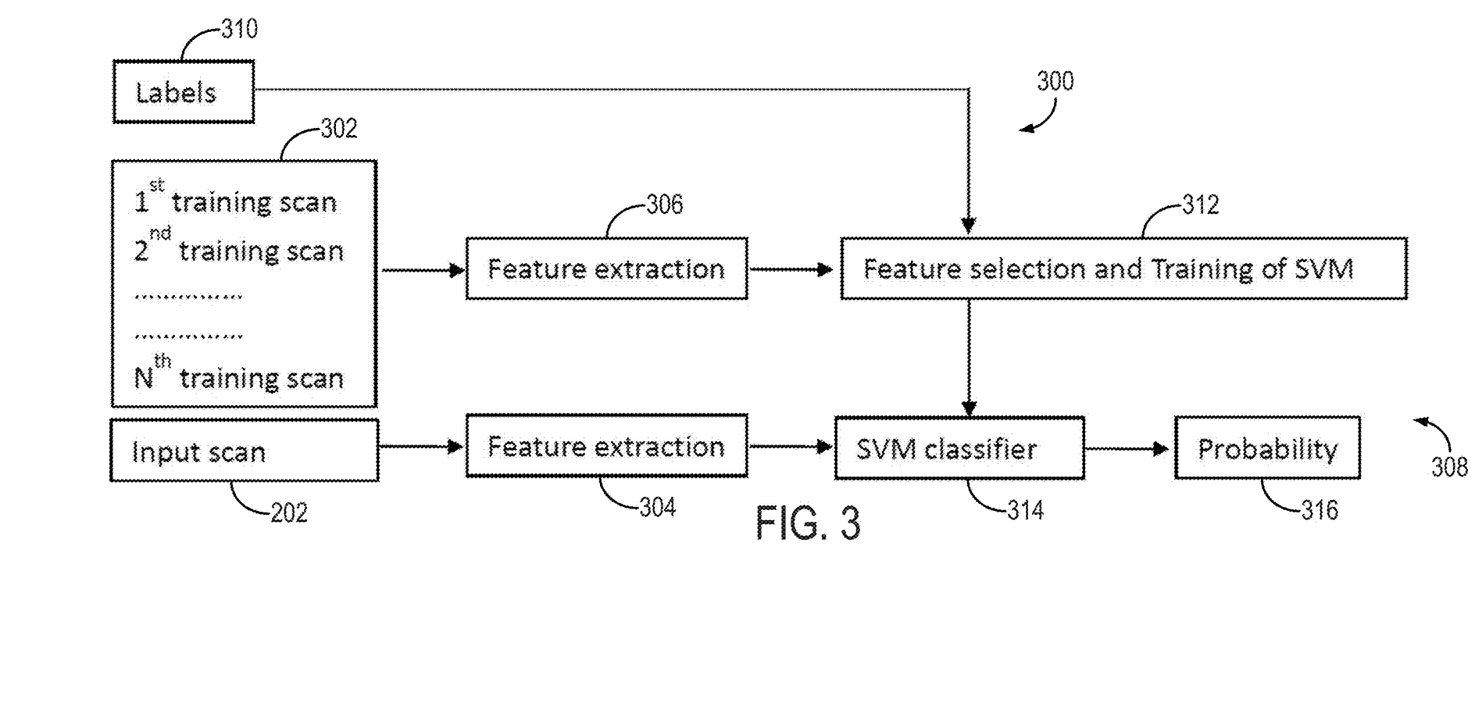
FIG. 3 is a flow chart of a process for machine learning in accordance with the present disclosure.

A process in accordance with the present disclosure can be conceptualized as including 3 main steps that include: (1) feature extraction, (2) feature selection, (3) support vector machine (SVM) classifier construction. Referring to FIG. 2, a flowchart is provided to illustrate one implementation of feature extraction. FIG. 3 provides a flowchart that illustrates one implementation of a machine learning process, which includes both feature selection and SVM classification. Before turning to FIGS. 2 and 3, in this non-limiting example, for each class, a training set of N scans from different subjects may be used with N/2 positives samples and N/2 negative samples. For the brain coverage classifier, for example, the dataset might include N/2 brain scans, N/6 chest scans, N/6 abdomen-pelvis scans and N/6 chest-abdomen-pelvis scans. The training set for the other classifiers can follow a similar scheme.

Turning to FIG. 2, a feature extraction process 200 begins by using an input scan 202 and a template 204 to perform a registration process at process block 206. For example, image registration may be performed to achieve basic image alignment to improve the robustness of the features extracted. The input scan 202 is registered at process block 206 to a manually selected template from the training set (a typical scan from the positive samples). An open source software, such as described in S. Klein, M. Staring, K. Murphy, M. A. Viergever, J. P. W. Pluim, "elastix: a toolbox for intensity based medical image registration," IEEE Transactions on Medical Imaging, vol. 29, no. 1, pp. 196-205 (2010), can be used for the registration step. More particularly, this may include multiresolution affine registration involving 3 levels, with mutual information (64 histogram bins) as the cost function. Optimization may be performed using a stochastic gradient decent algorithm included in the open-source software, such as Elastix.

After registration at process block 206, each of the registered scans can be evenly split into k×k×k non-overlapping blocks at process block 208, within which mean intensity can be computed to represent its corresponding block. Thus, scans of the training set can each be represented by a $1 \times k^3$ feature vector stored at process block 210. In this non-limiting example, in total, $N \times k^3$ features are extracted from the training set to be fed into the model.

Figure 4:
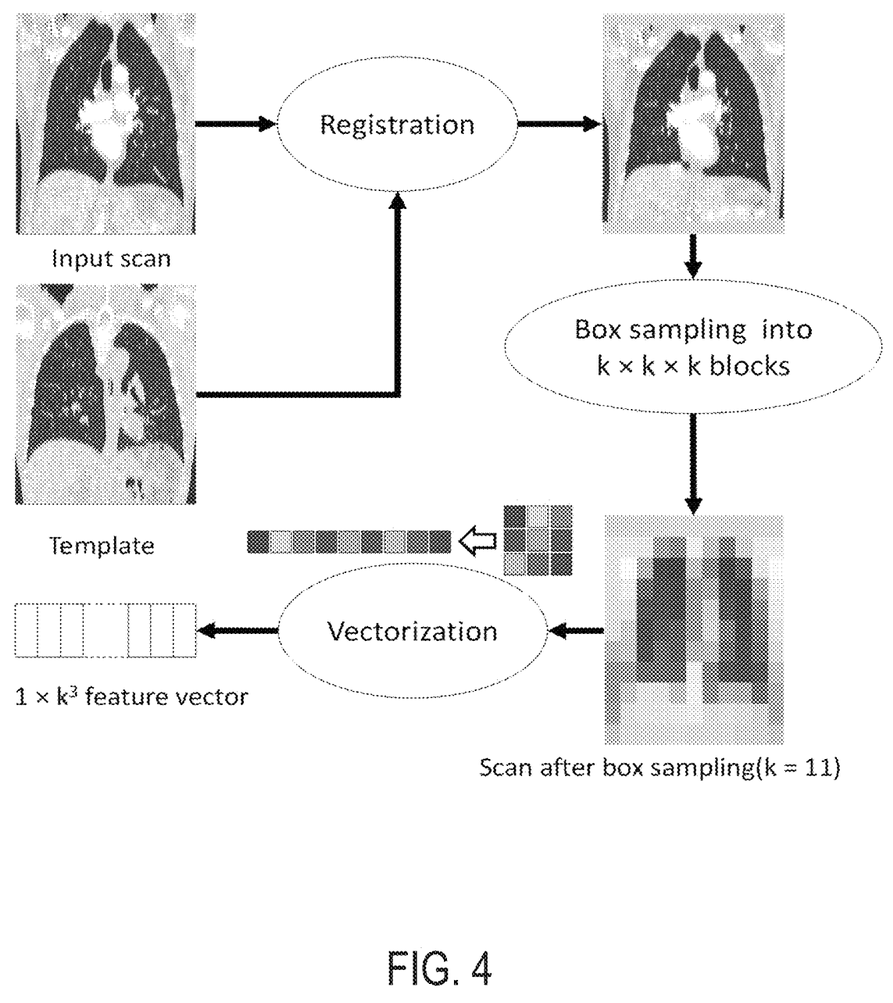
FIG. 4 is a schematic flow chart illustrating one example of a process in accordance with the present disclosure.
Figure 5A:
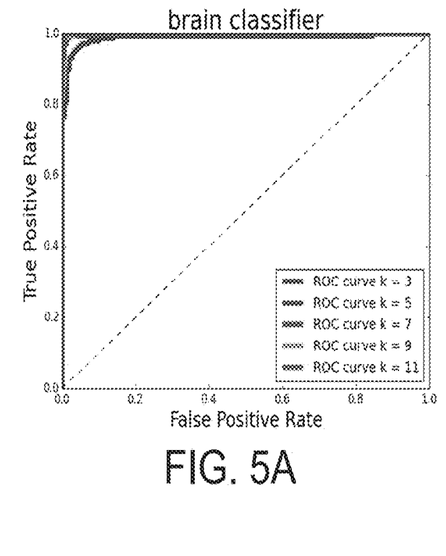
FIG. 5A is a graph showing brain image classification results in accordance with the present disclosure.
Figure 5B:
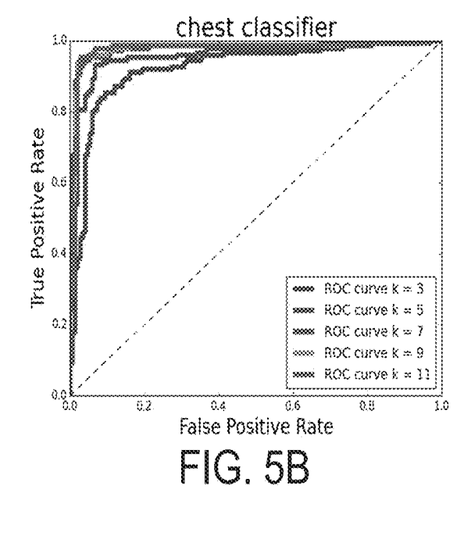
FIG. 5B is a graph showing chest image classification results in accordance with the present disclosure.
Figure 5C:
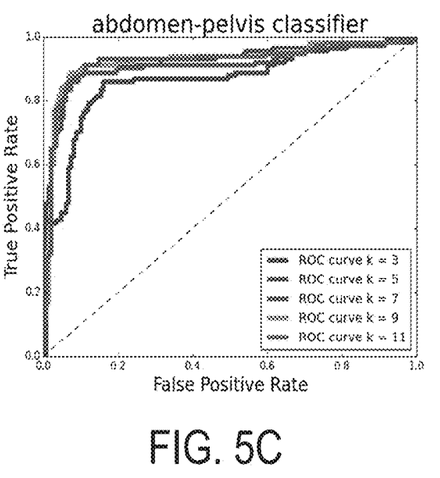
FIG. 5C is a graph showing abdomen-pelvis image classification results in accordance with the present disclosure.
Figure 5D:
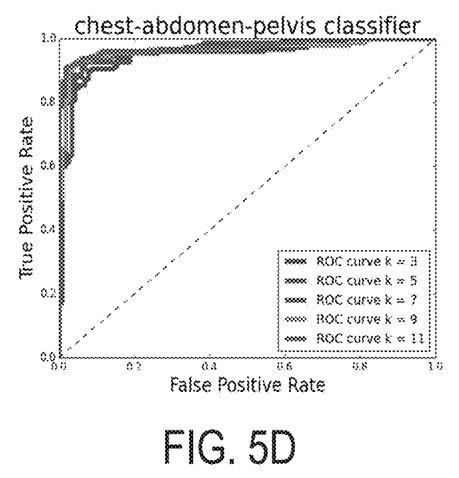
FIG. 5D is a graph showing chest-abdomen-pelvis image classification results in accordance with the present disclosure.

FIG. 4 demonstrates a non-limiting example of the registration process demonstrated in FIG. 2. In this example, the system may include a computing device coupled to a network and comprising at least one processor executing computer executable instructions. This computing device may receive an input scan, possibly a training scan or another input scan from a medical imaging device, such as a CT or MRI device described in more detail herein.

The system may select a template within a training set for a class of medical images (e.g., brain, chest, abdomen-pelvis, chest-abdomen-pelvis, etc.). The template may comprise a typical scan from positive samples of the class, and the selected template may be used to register the received input scan. The registered image may then be sampled into a plurality of non-overlapping blocks (e.g., k×k×k blocks in FIG. 4).

FIG. 4 further demonstrates the registered input scan after the sampling process. Using data from the plurality of non-overlapping blocks, the system then performs vectorization on the input scan. In this non-limiting example, the feature vector data created from the sampled input data results in the training data for each input scan, which, in turn, is used to train the machine learning algorithms described in detail below. In this non-limiting example the feature vector is a $1 \times k^3$ feature vector.

Referring to FIG. 3, feature selection 300 can be performed using a correlation-based feature selection (CFS) algorithm, which is a filter based feature selection method. One non-limiting example of a CFS algorithm is described in Hall, M. A. "Correlation based feature selection for machine learning." Ph.D Diss. Dept of Computer Science, Waikato University (1998), which is incorporated herein by reference in its entirety.

In particular, referring to FIG. 3, a CFS algorithm is provided with the input scan 202 and a volume of training scans 302. The CFS algorithm selects a subset of features 304, 306 for both data sets based on a heuristic 'merit', which takes into account both the usefulness of individual features for predicting the class label and the level of inter-correlation among the selected features. One further, non-limiting example of such an implementation is described in Hall, M. A. and Smith, L. A. "Practical Feature Subset Selection for Machine Learning," Proc, 21st Australasian computer science conference, 181-191 (1998), which is incorporated herein by reference in its entirety.

The heuristic 'merit' may be defined as:

$$M = \frac{k\overline{r_{cf}}}{\sqrt{k + k(k-1)\overline{r_{ff}}}}$$

where M is the heuristic 'merit' of a feature subset S containing k features, $\overline{r_{cf}}$ is the mean feature-class correlation, and $\overline{r_{ff}}$ is the average feature-feature inter-correlation. Both $\overline{r_{cf}}$ and $\overline{r_{ff}}$ are computed by symmetrical uncertainty, which is defined as:

$$r_{XY} = 2\frac{IG}{H(X) + H(Y)}$$

where IG is information gain equivalent to H(X)=H(Y)−H(X,Y),H(Y) are entropy and X, Y are vectors. $X=(x_1, x_2, \ldots x_{n-1}, x_n)$, $Y=(y_1, y_2, \ldots y_{n-1}, y_n)$ where $x_i \in \mathbb{R}$ and $y_i \in \mathbb{R}$.

From there SVM classifier operation 308 can be performed. Specifically, the labels 310 can be used as an input along with the extracted features 306 from the training scans 302 to perform feature selection and training of SVM 312. With features selected and training of the SVM 312, the features extracted 304 from the input scan 202 can be used to derive SVM classifiers 314 and, ultimately, produce a probability of the proper classification of the given view 316 reflected in the input scan 202.

More particularly, an SVM may be used with a radial basis function (RBF) kernel was used to build the classification model. In this non-limiting example, there may be two parameters for an RBF kernel: C and γ. A grid-search strategy with 5 fold cross-validation can be used to optimize C and γ. To be more specific, the training set can be divided into 5 subsets of equal size and one subset considered using the classifier trained on the remaining 4 subsets. One non-limiting example of a SVM construct is provided in Joachims, T. "Text categorization with Support Vector Machines: Learning with many relevant features," Proceedings of the 10th European Conference on Machine Learning, 137-142 (1998), which is incorporated herein by reference in its entirety.

EXPERIMENT AND RESULT

An experiment was performed to validate both the above-described systems and method and to demonstrate the clinical application of the present disclosure. Data used in this experiment were extracted from a de-identified research database from various studies and clinical trials. They had wide range of image sizes, resolutions, and use of contrast agents. In total, 600 scans were used with 150 scans of brain, chest, abdomen-pelvis and CAP, respectively. For each type, 150 scans confirmed from different subjects were evenly divided into non-overlapping training and test sets. All scans were manually labeled by a trained technician. Four binary classifiers were built and for each a training set of 150 scans from different subjects was used with 75 positive samples and 75 negative samples. Parameters for feature selection and the training process were optimized on the training set. After building the classifiers, a test set of subjects not in the training set was used. For each class, the test set was also composed of 75 positive samples and 75 negative samples. Each scan went through the same feature extraction process as described for the training set.

Images of the brain, chest, abdomen-pelvis and CAP after affine registration to an abdomen-pelvis template were produced. Two-fold cross validation was used to evaluate classifier performance. This means that the original training and testing sets were interchanged in the second fold. Based on the probability of each sample predicted by the classifiers and corresponding known labels, the Receiver Operating Characteristic (ROC curve) of each binary classifier was obtained.

Classifiers for brain, chest, abdomen-pelvis, and CAP anatomical coverages were built with various image sampling scales of k=3, 5, 7, 9, 11. As shown in Table 1 below, brain classifiers demonstrate superior classification performance with AUC equal or close to 1.0 despite block size. Classifiers of chest, abdomen-pelvis and CAP had lower AUC but are still above 0.9 from k=5 to 11.

TABLE 1

AUC of four classifiers in case of k = 3, 5, 7, 9, 11

|  | K = 3 | K = 5 | K = 7 | K = 9 | K = 11 |
| --- | --- | --- | --- | --- | --- |
| Brain classifier | 0.99 | 1 | 1 | 1 | 1 |
| Chest classifier | 0.93 | 0.96 | 0.98 | 0.98 | 0.98 |
| Abdomen-pelvis | 0.86 | 0.93 | 0.92 | 0.93 | 0.92 |
| CAP classifier | 0.95 | 0.97 | 0.96 | 0.97 | 0.98 |

Performance of abdomen-pelvis classifiers fluctuates mildly from k=5 to 11. The overall performance of four classifiers in case of k=3 remains within clinically-acceptable bounds.

FIGS. 5A-5D demonstrate the results of such experimentation, and as seen in these figures, graphs demonstrating the results of such experimentation in relation to brain, chest, abdomen-pelvis, and chest-abdomen-pelvis image classification show a high true positive rate for each of these classifiers in a means comparable to Table 1 above.

Thus, as provided herein, a machine learning architecture is provided to build multiple binary classifiers of CT anatomical coverages: brain, chest, abdomen-pelvis, and chest-abdomen-pelvis (CAP). Compared to other existing methods, the present method can utilize a whole series of images, instead of single 2D slice for identification. Furthermore, in the present systems and methods, there is no need to perform image segmentation. Rather, features extracted are from the acquired images without segmentation. The removal of reliance upon segmentation reduces the prospect of variability resulting from segmentation variability and, thus, makes the above-described systems and methods more robust.

All classifiers showed strong performance demonstrating clinically feasibility for automatically labeling large numbers of medical images in clinical medicine or research, as demonstrated in FIGS. 5A-5D. Additionally, the techniques described above may be applied to identify other imaging features beyond anatomical coverage, for example, prone or supine, residual lung volume or total lung capacity, contrast or non-contrast, and so on. Moreover, scans from other imaging modalities such as MRI, PET, and so on can be analyzed. Further, the template used in registration stage can be manually selected or an atlas can be used that is based on overall positive scans to achieve better alignment Referring particularly now to FIGS. 6A and 6B, an example of an x-ray computed tomography ("CT") imaging system 600 is illustrated. The CT system includes a gantry 602, to which at least one x-ray source 604 is coupled. The x-ray source 604 projects an x-ray beam 606, which may be a fan-beam or cone-beam of x-rays, towards a detector array 608 on the opposite side of the gantry 602. The detector array 608 includes a number of x-ray detector elements 610. Together, the x-ray detector elements 610 sense the projected x-rays 606 that pass through a subject 612, such as a medical patient or an object undergoing examination, that is positioned in the CT system 600. Each x-ray detector element 610 produces an electrical signal that may represent the intensity of an impinging x-ray beam and, hence, the attenuation of the beam as it passes through the subject 612. In some configurations, each x-ray detector 610 is capable of counting the number of x-ray photons that impinge upon the detector 610. During a scan to acquire x-ray projection data, the gantry 602 and the components mounted thereon rotate about a center of rotation 614 located within the CT system 600.

Figure 6A:
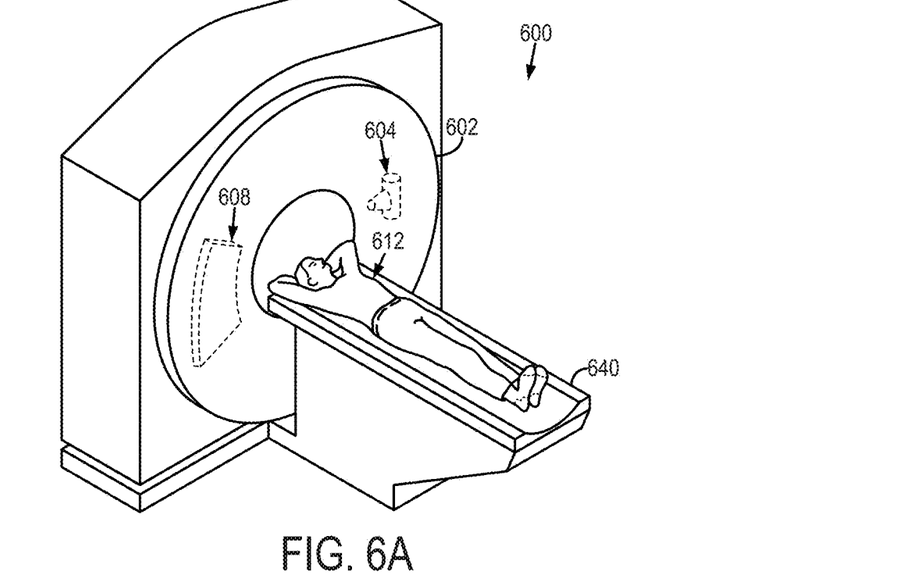
FIG. 6A is an illustration of an example of an x-ray CT system configured in accordance with the present disclosure.
Figure 6B:
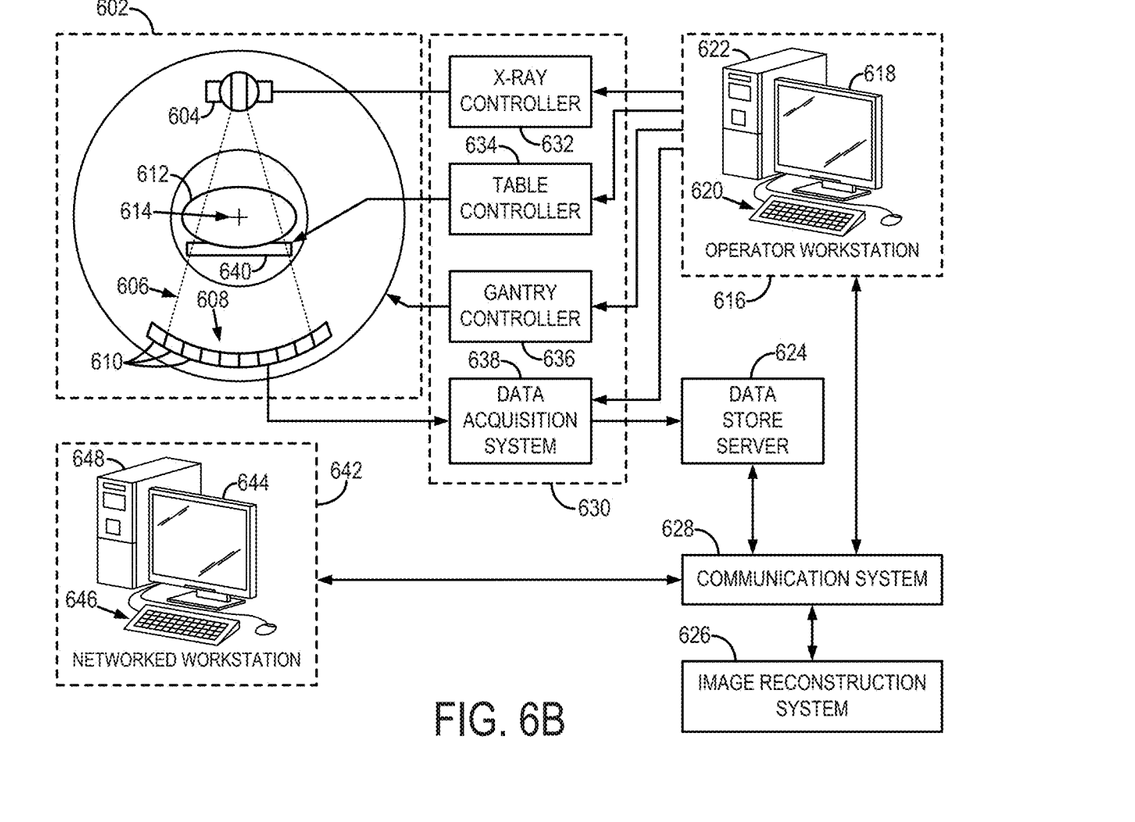
FIG. 6B is a block diagram of the x-ray CT system of FIG. 6A configured in accordance with the present disclosure.

The CT system 600 also includes an operator workstation 616, which typically includes a display 618; one or more input devices 620, such as a keyboard and mouse; and a computer processor 622. The computer processor 622 may include a commercially available programmable machine running a commercially available operating system. The operator workstation 616 provides the operator interface that enables scanning control parameters to be entered into the CT system 600. In general, the operator workstation 616 is in communication with a data store server 624 and an image reconstruction system 626. By way of example, the operator workstation 616, data store sever 624, and image reconstruction system 626 may be connected via a communication system 628, which may include any suitable network connection, whether wired, wireless, or a combination of both. As an example, the communication system 628 may include both proprietary or dedicated networks, as well as open networks, such as the internet.

The operator workstation 616 is also in communication with a control system 630 that controls operation of the CT system 600. The control system 630 generally includes an x-ray controller 632, a table controller 634, a gantry controller 636, and a data acquisition system 638. The x-ray controller 632 provides power and timing signals to the x-ray source 604 and the gantry controller 636 controls the rotational speed and position of the gantry 602. The table controller 634 controls a table 640 to position the subject 612 in the gantry 602 of the CT system 600.

The DAS 638 samples data from the detector elements 610 and converts the data to digital signals for subsequent processing. For instance, digitized x-ray data is communicated from the DAS 638 to the data store server 624. The image reconstruction system 626 then retrieves the x-ray data from the data store server 624 and reconstructs an image therefrom. The image reconstruction system 626 may include a commercially available computer processor, or may be a highly parallel computer architecture, such as a system that includes multiple-core processors and massively parallel, high-density computing devices. Optionally, image reconstruction can also be performed on the processor 622 in the operator workstation 616. Reconstructed images can then be communicated back to the data store server 624 for storage or to the operator workstation 616 to be displayed to the operator or clinician.

The CT system 600 may also include one or more networked workstations 642. By way of example, a networked workstation 642 may include a display 644; one or more input devices 646, such as a keyboard and mouse; and a processor 648. The networked workstation 642 may be located within the same facility as the operator workstation 616, or in a different facility, such as a different healthcare institution or clinic.

The networked workstation 642, whether within the same facility or in a different facility as the operator workstation 616, may gain remote access to the data store server 624 and/or the image reconstruction system 626 via the communication system 628. Accordingly, multiple networked workstations 642 may have access to the data store server 624 and/or image reconstruction system 626. In this manner, x-ray data, reconstructed images, or other data may be exchanged between the data store server 624, the image reconstruction system 626, and the networked workstations 642, such that the data or images may be remotely processed by a networked workstation 642. This data may be exchanged in any suitable format, such as in accordance with the transmission control protocol ("TCP"), the internet protocol ("IP"), or other known or suitable protocols.

Figure 7:
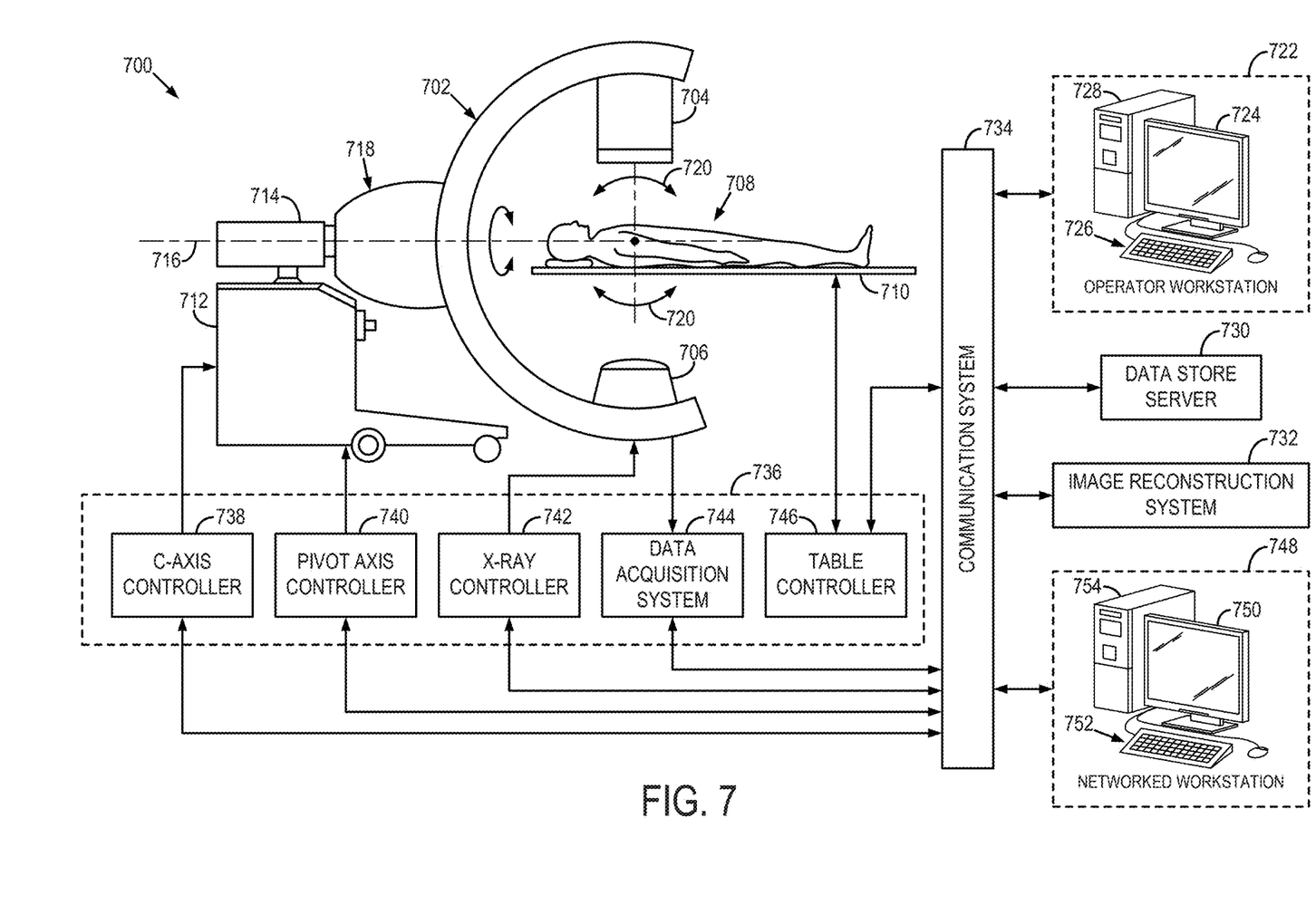
FIG. 7 is an illustration of an example of a C-arm x-ray imaging system configured in accordance with the present disclosure.

Referring particularly to FIG. 7, an example of a so-called "C-arm" x-ray imaging system 700 is illustrated for use in accordance with the present disclosure. Such an imaging system is generally designed for use in connection with interventional procedures. The C-arm x-ray imaging system 700 includes a gantry 702 having a C-arm to which an x-ray source assembly 704 is coupled on one end and an x-ray detector array assembly 706 is coupled at its other end. The gantry 702 enables the x-ray source assembly 704 and detector array assembly 706 to be oriented in different positions and angles around a subject 708, such as a medical patient or an object undergoing examination, that is positioned on a table 710. When the subject 708 is a medical patient, this configuration enables a physician access to the subject 708.

The x-ray source assembly 704 includes at least one x-ray source that projects an x-ray beam, which may be a fan-beam or cone-beam of x-rays, towards the x-ray detector array assembly 706 on the opposite side of the gantry 702. The x-ray detector array assembly 706 includes at least one x-ray detector, which may include a number of x-ray detector elements. Examples of x-ray detectors that may be included in the x-ray detector array assembly 706 include flat panel detectors, such as so-called "small flat panel" detectors, in which the detector array panel may be around 20×20 centimeters in size. Such a detector panel allows the coverage of a field-of-view of approximately twelve centimeters.

Together, the x-ray detector elements in the one or more x-ray detectors housed in the x-ray detector array assembly 706 sense the projected x-rays that pass through a subject 708. Each x-ray detector element produces an electrical signal that may represent the intensity of an impinging x-ray beam and, thus, the attenuation of the x-ray beam as it passes through the subject 708. In some configurations, each x-ray detector element is capable of counting the number of x-ray photons that impinge upon the detector. During a scan to acquire x-ray projection data, the gantry 702 and the components mounted thereon rotate about an isocenter of the C-arm x-ray imaging system 700.

The gantry 702 includes a support base 712. A support arm 714 is rotatably fastened to the support base 712 for rotation about a horizontal pivot axis 716. The pivot axis 716 is aligned with the centerline of the table 710 and the support arm 714 extends radially outward from the pivot axis 716 to support a C-arm drive assembly 718 on its outer end. The C-arm gantry 702 is slidably fastened to the drive assembly 718 and is coupled to a drive motor (not shown) that slides the C-arm gantry 702 to revolve it about a C-axis, as indicated by arrows 720. The pivot axis 716 and C-axis are orthogonal and intersect each other at the isocenter of the C-arm x-ray imaging system 700, which is indicated by the black circle and is located above the table 710.

The x-ray source assembly 704 and x-ray detector array assembly 706 extend radially inward to the pivot axis 716 such that the center ray of this x-ray beam passes through the system isocenter. The center ray of the x-ray beam can thus be rotated about the system isocenter around either the pivot axis 716, the C-axis, or both during the acquisition of x-ray attenuation data from a subject 708 placed on the table 710. During a scan, the x-ray source and detector array are rotated about the system isocenter to acquire x-ray attenuation projection data from different angles. By way of example, the detector array is able to acquire thirty projections, or views, per second.

The C-arm x-ray imaging system 700 also includes an operator workstation 722, which typically includes a display 724; one or more input devices 726, such as a keyboard and mouse; and a computer processor 728. The computer processor 728 may include a commercially available programmable machine running a commercially available operating system. The operator workstation 722 provides the operator interface that enables scanning control parameters to be entered into the C-arm x-ray imaging system 700. In general, the operator workstation 722 is in communication with a data store server 730 and an image reconstruction system 732. By way of example, the operator workstation 722, data store sever 730, and image reconstruction system 732 may be connected via a communication system 734, which may include any suitable network connection, whether wired, wireless, or a combination of both. As an example, the communication system 734 may include both proprietary or dedicated networks, as well as open networks, such as the internet.

The operator workstation 722 is also in communication with a control system 736 that controls operation of the C-arm x-ray imaging system 700. The control system 736 generally includes a C-axis controller 738, a pivot axis controller 740, an x-ray controller 742, a data acquisition system ("DAS") 744, and a table controller 746. The x-ray controller 742 provides power and timing signals to the x-ray source assembly 704, and the table controller 746 is operable to move the table 710 to different positions and orientations within the C-arm x-ray imaging system 700.

The rotation of the gantry 702 to which the x-ray source assembly 704 and the x-ray detector array assembly 706 are coupled is controlled by the C-axis controller 738 and the pivot axis controller 740, which respectively control the rotation of the gantry 702 about the C-axis and the pivot axis 716. In response to motion commands from the operator workstation 722, the C-axis controller 738 and the pivot axis controller 740 provide power to motors in the C-arm x-ray imaging system 700 that produce the rotations about the C-axis and the pivot axis 716, respectively. For example, a program executed by the operator workstation 722 generates motion commands to the C-axis controller 738 and pivot axis controller 740 to move the gantry 702, and thereby the x-ray source assembly 704 and x-ray detector array assembly 706, in a prescribed scan path.

The DAS 744 samples data from the one or more x-ray detectors in the x-ray detector array assembly 706 and converts the data to digital signals for subsequent processing. For instance, digitized x-ray data is communicated from the DAS 744 to the data store server 730. The image reconstruction system 732 then retrieves the x-ray data from the data store server 730 and reconstructs an image therefrom. The image reconstruction system 730 may include a commercially available computer processor, or may be a highly parallel computer architecture, such as a system that includes multiple-core processors and massively parallel, high-density computing devices. Optionally, image reconstruction can also be performed on the processor 728 in the operator workstation 722. Reconstructed images can then be communicated back to the data store server 730 for storage or to the operator workstation 722 to be displayed to the operator or clinician.

The C-arm x-ray imaging system 700 may also include one or more networked workstations 748. By way of example, a networked workstation 748 may include a display 750; one or more input devices 752, such as a keyboard and mouse; and a processor 754. The networked workstation 748 may be located within the same facility as the operator workstation 722, or in a different facility, such as a different healthcare institution or clinic.

The networked workstation 748, whether within the same facility or in a different facility as the operator workstation 722, may gain remote access to the data store server 730, the image reconstruction system 732, or both via the communication system 734. Accordingly, multiple networked workstations 748 may have access to the data store server 730, the image reconstruction system 732, or both. In this manner, x-ray data, reconstructed images, or other data may be exchanged between the data store server 730, the image reconstruction system 732, and the networked workstations 748, such that the data or images may be remotely processed by the networked workstation 748. This data may be exchanged in any suitable format, such as in accordance with the transmission control protocol ("TCP"), the Internet protocol ("IP"), or other known or suitable protocols.

Figure 8:
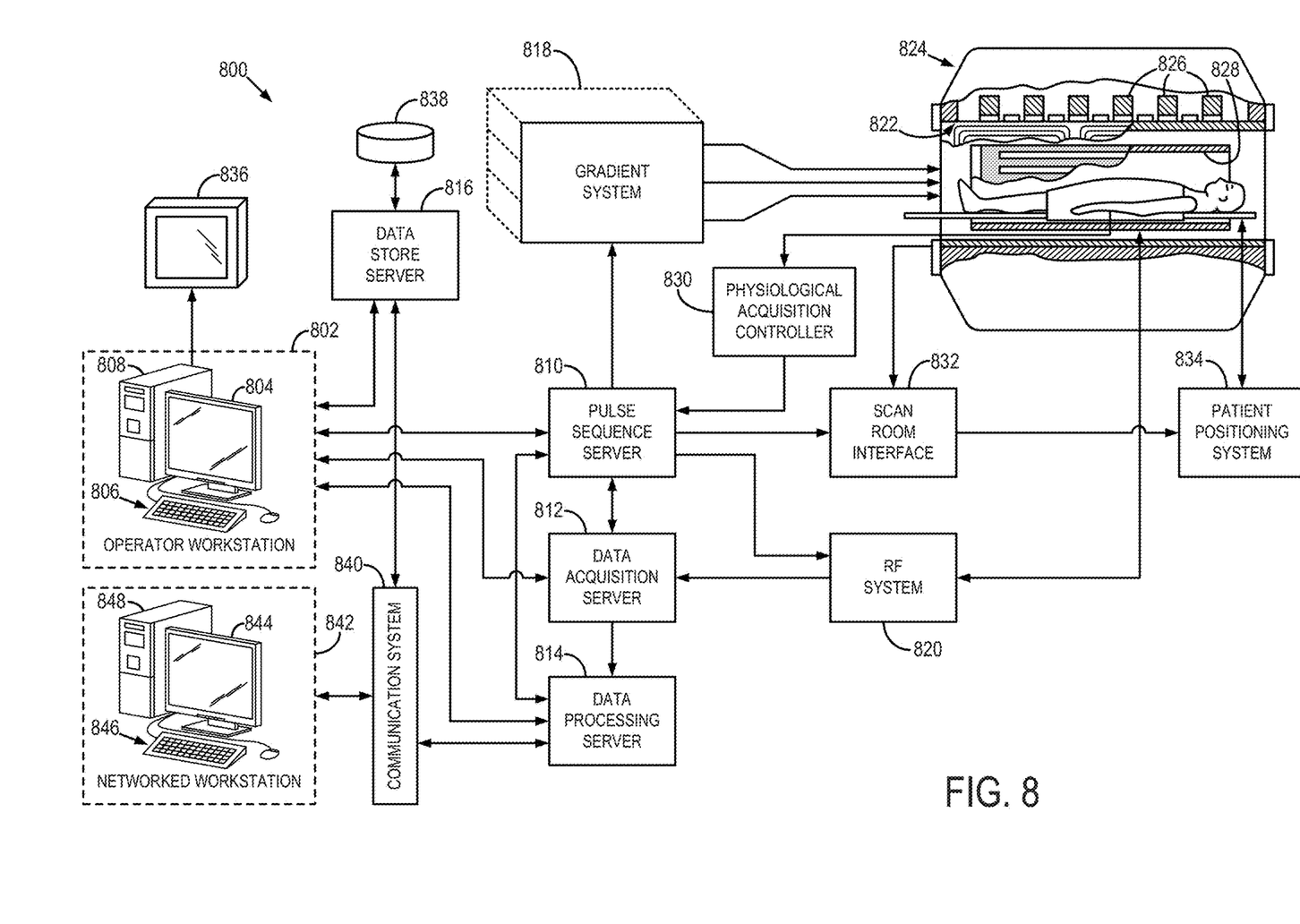
FIG. 8 is a block diagram of an example of a magnetic resonance imaging (MRI) system configured in accordance with the present disclosure.

Referring particularly now to FIG. 8, an example of a magnetic resonance imaging ("MRI") system 800 is illustrated. The MRI system 800 includes an operator workstation 802, which will typically include a display 804; one or more input devices 806, such as a keyboard and mouse; and a processor 808. The processor 808 may include a commercially available programmable machine running a commercially available operating system. The operator workstation 802 provides the operator interface that enables scan prescriptions to be entered into the MRI system 800. In general, the operator workstation 802 may be coupled to four servers: a pulse sequence server 810; a data acquisition server 812; a data processing server 814; and a data store server 816. The operator workstation 802 and each server 810, 812, 814, and 816 are connected to communicate with each other. For example, the servers 810, 812, 814, and 816 may be connected via a communication system 840, which may include any suitable network connection, whether wired, wireless, or a combination of both. As an example, the communication system 840 may include both proprietary or dedicated networks, as well as open networks, such as the internet.

The pulse sequence server 810 functions in response to instructions downloaded from the operator workstation 802 to operate a gradient system 818 and a radiofrequency ("RF") system 820. Gradient waveforms necessary to perform the prescribed scan are produced and applied to the gradient system 818, which excites gradient coils in an assembly 822 to produce the magnetic field gradients $G_x$, $G_y$, and $G_z$ used for position encoding magnetic resonance signals. The gradient coil assembly 822 forms part of a magnet assembly 824 that includes a polarizing magnet 826 and a whole-body RF coil 828.

RF waveforms are applied by the RF system 820 to the RF coil 828, or a separate local coil (not shown in FIG. 8), in order to perform the prescribed magnetic resonance pulse sequence. Responsive magnetic resonance signals detected by the RF coil 828, or a separate local coil (not shown in FIG. 8), are received by the RF system 820, where they are amplified, demodulated, filtered, and digitized under direction of commands produced by the pulse sequence server 810. The RF system 820 includes an RF transmitter for producing a wide variety of RF pulses used in MRI pulse sequences. The RF transmitter is responsive to the scan prescription and direction from the pulse sequence server 810 to produce RF pulses of the desired frequency, phase, and pulse amplitude waveform. The generated RF pulses may be applied to the whole-body RF coil 828 or to one or more local coils or coil arrays (not shown in FIG. 8).

The RF system 820 also includes one or more RF receiver channels. Each RF receiver channel includes an RF preamplifier that amplifies the magnetic resonance signal received by the coil 828 to which it is connected, and a detector that detects and digitizes the I and Q quadrature components of the received magnetic resonance signal. The magnitude of the received magnetic resonance signal may, therefore, be determined at any sampled point by the square root of the sum of the squares of the I and Q components:

$$M=\sqrt{I^2+Q^2}$$

and the phase of the received magnetic resonance signal may also be determined according to the following relationship:

$$\varphi = \tan^{-1}\left(\frac{Q}{I}\right)$$

The pulse sequence server 810 also optionally receives patient data from a physiological acquisition controller 830. By way of example, the physiological acquisition controller 830 may receive signals from a number of different sensors connected to the patient, such as electrocardiograph ("ECG") signals from electrodes, or respiratory signals from a respiratory bellows or other respiratory monitoring device. Such signals are typically used by the pulse sequence server 810 to synchronize, or "gate," the performance of the scan with the subject's heart beat or respiration.

The pulse sequence server 810 also connects to a scan room interface circuit 832 that receives signals from various sensors associated with the condition of the patient and the magnet system. It is also through the scan room interface circuit 832 that a patient positioning system 834 receives commands to move the patient to desired positions during the scan.

The digitized magnetic resonance signal samples produced by the RF system 820 are received by the data acquisition server 812. The data acquisition server 812 operates in response to instructions downloaded from the operator workstation 802 to receive the real-time magnetic resonance data and provide buffer storage, such that no data is lost by data overrun. In some scans, the data acquisition server 812 does little more than pass the acquired magnetic resonance data to the data processor server 814. However, in scans that require information derived from acquired magnetic resonance data to control the further performance of the scan, the data acquisition server 812 is programmed to produce such information and convey it to the pulse sequence server 810. For example, during prescans, magnetic resonance data is acquired and used to calibrate the pulse sequence performed by the pulse sequence server 810. As another example, navigator signals may be acquired and used to adjust the operating parameters of the RF system 820 or the gradient system 818, or to control the view order in which k-space is sampled. In still another example, the data acquisition server 812 may also be employed to process magnetic resonance signals used to detect the arrival of a contrast agent in a magnetic resonance angiography ("MRA") scan. By way of example, the data acquisition server 812 acquires magnetic resonance data and processes it in real-time to produce information that is used to control the scan.

The data processing server 814 receives magnetic resonance data from the data acquisition server 812 and processes it in accordance with instructions downloaded from the operator workstation 802. Such processing may, for example, include one or more of the following: reconstructing two-dimensional or three-dimensional images by performing a Fourier transformation of raw k-space data; performing other image reconstruction algorithms, such as iterative or backprojection reconstruction algorithms; applying filters to raw k-space data or to reconstructed images; generating functional magnetic resonance images; calculating motion or flow images; and so on.

Images reconstructed by the data processing server 814 are conveyed back to the operator workstation 802 where they are stored. Real-time images are stored in a data base memory cache (not shown in FIG. 8), from which they may be output to operator display 802 or a display 836 that is located near the magnet assembly 824 for use by attending physicians. Batch mode images or selected real time images are stored in a host database on disc storage 838. When such images have been reconstructed and transferred to storage, the data processing server 814 notifies the data store server 816 on the operator workstation 802. The operator workstation 802 may be used by an operator to archive the images, produce films, or send the images via a network to other facilities.

The MRI system 800 may also include one or more networked workstations 842. By way of example, a networked workstation 842 may include a display 844; one or more input devices 846, such as a keyboard and mouse; and a processor 848. The networked workstation 842 may be located within the same facility as the operator workstation 802, or in a different facility, such as a different healthcare institution or clinic.

The networked workstation 842, whether within the same facility or in a different facility as the operator workstation 802, may gain remote access to the data processing server 814 or data store server 816 via the communication system 840. Accordingly, multiple networked workstations 842 may have access to the data processing server 814 and the data store server 816. In this manner, magnetic resonance data, reconstructed images, or other data may be exchanged between the data processing server 814 or the data store server 816 and the networked workstations 842, such that the data or images may be remotely processed by a networked workstation 842. This data may be exchanged in any suitable format, such as in accordance with the transmission control protocol ("TCP"), the internet protocol ("IP"), or other known or suitable protocols.

The present invention has been described in terms of one or more preferred embodiments, and it should be appreciated that many equivalents, alternatives, variations, and modifications, aside from those expressly stated, are possible and within the scope of the invention.

The invention claimed is:

1. A system comprising:
   at least one medical imaging device acquiring at least one medical image, comprising at least a training scan and an input scan, from a subject;
   a computing device coupled to a network and comprising at least one processor executing computer executable instructions that, when executed, cause the system to:
   receive the training scan;
   perform a feature extraction from a series of acquired medical images, comprising:
   selecting a template aligned with the training scan;
   splitting the training scan into a set of kxkxk even and non-overlapping blocks; and
   generating a training data for the training scan comprising a feature vector derived from the set of kxkxk even and non-overlapping blocks;
   receive the input scan;
   select a subset of features for:
   the input scan; and
   a plurality of training scans including the training scan;
   classify the input scan as a brain image, a chest image, an abdomen-pelvis image, or a chest-abdomen-pelvis image according to at least one machine learning technique comparing the features for the input scan with the feature vector for each of the plurality of training scans, wherein a classification of the input scan is classified automatically, according to an image-covering classification comprising an overall coverage of the at least one medical image or an associated image view, based on an anatomy.

2. The system of claim 1, wherein the at least one medical imaging device comprises a computed tomography (CT) or magnetic resonance imaging (MRI) device.

3. The system of claim 1, wherein:
   the template comprises a scan from a positively classified sample selected from a training set; and
   aligning the template with the training scan comprises a multiresolution affine registration involving three levels, with a mutual information as a cost function.

4. The system of claim 1, wherein the mean intensity in each of the plurality of non-overlapping blocks is computed to represent a corresponding block.

5. The system of claim 4, wherein the subset of features is selected using a correlation-based feature selection (CFS) algorithm comprising a filter based feature selection method.

6. The system of claim 1, wherein the subset of features is selected based on a heuristic merit, taking into account:
   at least one individual feature for predicting a class label; and
   a level of inter-correlation among the subset of features.

7. The system of claim 1, wherein the input-scan_is classified utilizing:
   a label generated in association with the training scan in the plurality of training scans; and
   a feature vector within the training data for each of the plurality of training scans.

8. The system of claim 1, wherein the machine learning technique:
   is trained by comparing a first plurality of features in the plurality of training scans with a second plurality of features in a plurality of binary clusters comprising a plurality of positively classified samples and a plurality of negatively classified samples;
   employs a one-vs-rest strategy;
   classifies, without user interaction, the at least one medical image according to an overall coverage of the anatomical structures reflected in the at least one medical image.

9. The system of claim 1, wherein the machine learning technique is a support vector machine (SVM) construct based on a radial basis function (RBF) kernel used to build a classification model.

10. A method comprising:
    receiving, by a computing device coupled to a network and comprising at least one processor executing computer executable instruction within a memory, a training scan from at least one medical imaging device acquiring at least one medical image from a subject;
    performing, by the computing device, a feature extraction from a series of acquired medical images, comprising:
    selecting a template aligned with the training scan;
    splitting the training scan into a set of kxkxk even and non-overlapping blocks; and
    generating a training data for the training scan comprising a feature vector derived from the set of kxkxk even and non-overlapping blocks;
    receiving, by the computing device, an input scan;
    selecting, by the computing device, a subset of features for:
    the input scan; and
    a plurality of training scans including the training scan;
    classifying, by the computing device, the input scan as a brain image, a chest image, an abdomen-pelvis image, or a chest-abdomen-pelvis image according to at least one machine learning technique comparing the features for the input scan with the feature vector for each of the plurality of training scans, wherein a classification of the input scan is classified automatically, according to an image-covering classification comprising an overall coverage of the at least one medical image or an associated image view, based on an anatomy.

11. The method of claim 10, wherein the at least one medical imaging device comprises a computed tomography (CT) or magnetic resonance imaging (MRI) device.

12. The method of claim 10, wherein:
    the template comprises a scan from a positively classified sample selected from a training set; and
    aligning the template with the training scan comprises a multiresolution affine registration involving three levels, with a mutual information as a cost function.

13. The method of claim 10, wherein the mean intensity in each of the plurality of non-overlapping blocks is computed to represent a corresponding block.

14. The method of claim 13, further comprising the step of selecting the subset of features using a correlation-based feature selection (CFS) algorithm comprising a filter based feature selection method.

15. The method of claim 10, further comprising the step of selecting the subset of features based on a heuristic merit, taking into account:
- at least one individual feature for predicting a class label; and
- a level of inter-correlation among the subset of features.

16. The method of claim 10, wherein the input-scan is classified utilizing:
- a label generated in association with the training scan in the plurality of training scans; and
- a feature vector within the training data for each of the plurality of training scans.

17. The method of claim 10, wherein the machine learning technique:
- is trained by comparing a first plurality of features in the plurality of training scans with a second plurality of features in a plurality of binary clusters comprising a plurality of positively classified samples and a plurality of negatively classified samples;
- employs a one-vs-rest strategy;
- classifies, without user interaction, the at least one medical image according to an overall coverage of the anatomical structures reflected in the at least one medical image.

18. The method of claim 10, wherein the machine learning technique is a support vector machine (SVM) construct based on a radial basis function (RBF) kernel used to build a classification model.

* * * * *